US010877062B2

(12) United States Patent
Reid

(10) Patent No.: US 10,877,062 B2
(45) Date of Patent: Dec. 29, 2020

(54) AFT-LOCATED HEATED RAMP FOR ICE AND WATER MANAGEMENT OF ANGLE OF ATTACK SENSORS

(71) Applicant: Rosemount Aerospace Inc., Burnsville, MN (US)

(72) Inventor: Alexander N. Reid, St. Louis Park, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 415 days.

(21) Appl. No.: 15/975,384

(22) Filed: May 9, 2018

(65) Prior Publication Data

US 2019/0346479 A1 Nov. 14, 2019

(51) Int. Cl.
*G01P 13/02* (2006.01)
*B64D 15/16* (2006.01)
*G01P 5/165* (2006.01)

(52) U.S. Cl.
CPC ............ *G01P 13/025* (2013.01); *B64D 15/16* (2013.01); *G01P 5/165* (2013.01)

(58) Field of Classification Search
CPC .......... G01P 13/025; G01P 5/165; G01P 5/14; G01P 5/16; G01P 13/02; G01P 21/025; G01P 3/62; G01P 5/12; G01P 5/00; G01P 5/17; G01P 5/175; G01P 15/036; G01P 1/02; G01P 1/10; G01P 21/00; G01P 5/04; G01P 5/10; G01P 7/00; B64D 43/02; B64D 43/00; B64D 45/00
USPC ............................................... 73/170.02, 180
See application file for complete search history.

(56) References Cited

U.S. PATENT DOCUMENTS

| | | | |
|---|---|---|---|
| 3,665,760 A | 5/1972 | Pitches et al. | |
| 5,025,661 A * | 6/1991 | McCormack | G01L 19/0007 |
| | | | 73/180 |
| 5,322,246 A | 6/1994 | Henne et al. | |
| 5,438,865 A | 8/1995 | Greene | |
| 5,466,067 A | 11/1995 | Hagen et al. | |
| 5,628,565 A | 5/1997 | Hagen et al. | |
| 10,393,766 B2 * | 8/2019 | Alcaya | G01F 1/6842 |
| 2004/0188945 A1 | 9/2004 | Poincet et al. | |

(Continued)

FOREIGN PATENT DOCUMENTS

CA 2745138 A1 1/2012
CN 105142246 A 12/2015

(Continued)

OTHER PUBLICATIONS

Extended European Search Report for European Patent Application No. 19173361.7, dated Sep. 11, 2019, 11 pages.

(Continued)

*Primary Examiner* — Andre J Allen
(74) *Attorney, Agent, or Firm* — Kinney & Lange, P.A.

(57) ABSTRACT

An angle of attack sensor includes a vane assembly and a multi-piece faceplate adjacent the vane assembly. The faceplate includes a mounting plate having an opening and a heated chassis positioned adjacent the mounting plate and having a ring portion extending into the opening. The ring portion includes a narrow fore portion extending into the opening, a wide aft portion extending into the opening, and an aft-located ramp connected to the wide aft portion and extending through the opening beyond an exterior surface of the mounting plate.

20 Claims, 5 Drawing Sheets

(56) References Cited

U.S. PATENT DOCUMENTS

| | | | |
|---|---|---|---|
| 2015/0082878 A1 | 3/2015 | Bigand | |
| 2015/0344137 A1* | 12/2015 | Bartz | B64D 15/12 219/201 |
| 2016/0114883 A1 | 4/2016 | Guerry et al. | |
| 2016/0356175 A1 | 12/2016 | Waddington | |
| 2019/0210734 A1* | 7/2019 | Whalen | G01P 13/025 |
| 2019/0242924 A1 | 8/2019 | Lang et al. | |
| 2019/0346478 A1* | 11/2019 | Reid | B64D 15/00 |

FOREIGN PATENT DOCUMENTS

| | | | |
|---|---|---|---|
| CN | 107687350 A | 2/2018 | |
| CN | 107843249 A | 3/2018 | |
| DE | 102008007469 A1 | 8/2009 | |
| EP | 1844863 A1 | 10/2007 | |
| EP | 2950106 A1 | 12/2015 | |
| EP | 2980589 A1 | 2/2016 | |
| EP | 3012187 A1 | 4/2016 | |
| EP | 3056884 A1 | 8/2016 | |
| EP | 3413025 A1 | 12/2018 | |
| EP | 3567376 A1 * | 11/2019 | B64D 15/12 |
| WO | WO03087847 A1 | 10/2003 | |

OTHER PUBLICATIONS

Extended European Search Report for European Patent Application No. 19173355.9, dated Sep. 11, 2019, 12 pages.
Extended European Search Report for European Patent Application No. 18215700.8 dated May 20, 2019, 9 pages.

* cited by examiner

AFT-LOCATED HEATED RAMP FOR ICE AND WATER MANAGEMENT OF ANGLE OF ATTACK SENSORS

BACKGROUND

The present disclosure relates to sensors, and in particular, to angle of attack sensors.

Angle of attack sensors with rotatable vanes are installed on the exterior of aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

Oncoming airflow may contain water or ice particles that collect on the exterior surface, or faceplate, of the angle of attack sensor. The water can freeze onto the faceplate and accumulate near the vane. Large ice growths near the vane can interfere with the accuracy of the angle of attack sensor output.

SUMMARY

An angle of attack sensor includes a vane assembly and a multi-piece faceplate adjacent the vane assembly. The faceplate includes a mounting plate having an opening and a heated chassis positioned adjacent the mounting plate and having a ring portion extending into the opening. The ring portion includes a narrow fore portion extending into the opening, a wide aft portion extending into the opening, and an aft-located ramp connected to the wide aft portion and extending through the opening beyond an exterior surface of the mounting plate.

A method for preventing significant ice accumulation on an exterior surface of a faceplate adjacent a vane assembly, the faceplate including a heated chassis adjacent a mounting plate, includes re-routing fluid away from the exterior surface of the mounting plate with an aft-located ramp connected to a wide portion of the heated chassis and releasing the fluid into passing airflow.

A heated chassis for use in an angle of attack sensor having a vane assembly and a multi-piece faceplate including a mounting plate with an opening is positioned adjacent the mounting plate. The heated chassis includes a pocket within which a portion of the vane assembly is positioned and a ring portion including: a narrow fore portion extending through the opening, a wide aft portion extending through the opening, and an aft-located ramp connected to the wide aft portion and extending through the opening beyond an exterior surface of the mounting plate.

DETAILED DESCRIPTION

In general, the present disclosure describes a multi-piece faceplate of an angle of attack (AOA) sensor that includes a mounting plate and a heated chassis having a heated aft-located ramp for capturing and rerouting water on the mounting plate, preventing ice accumulation that can cause vane deflection and alter sensor output. The ramp is capable of functioning properly when the angle of attack sensor has an offset orientation. Additionally, the angle of attack sensor may include a ramp heater dedicated to providing heat to the ramp.

Figure 1A:
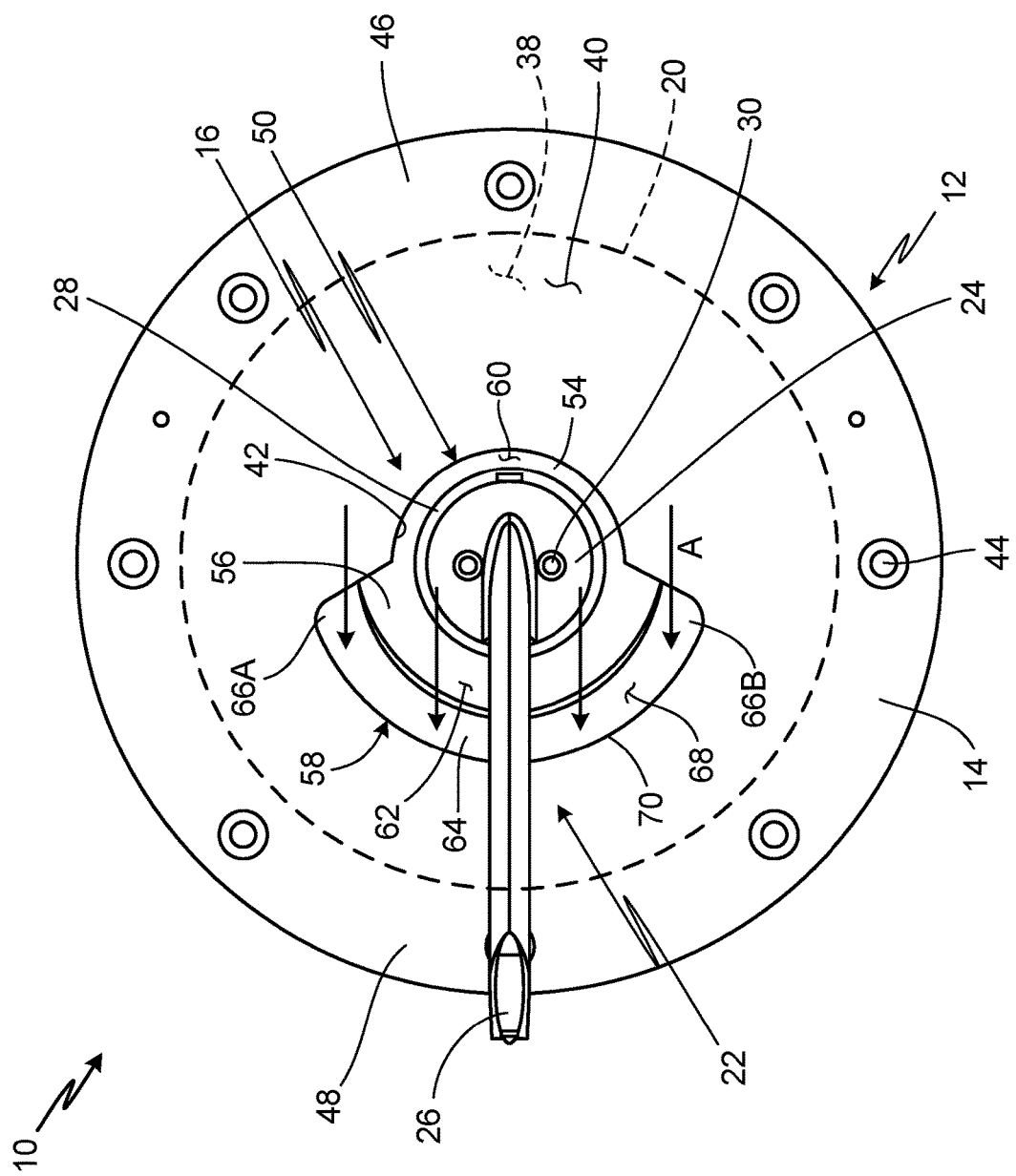
FIG. 1A is a top view of an angle of attack sensor.
Figure 1B:
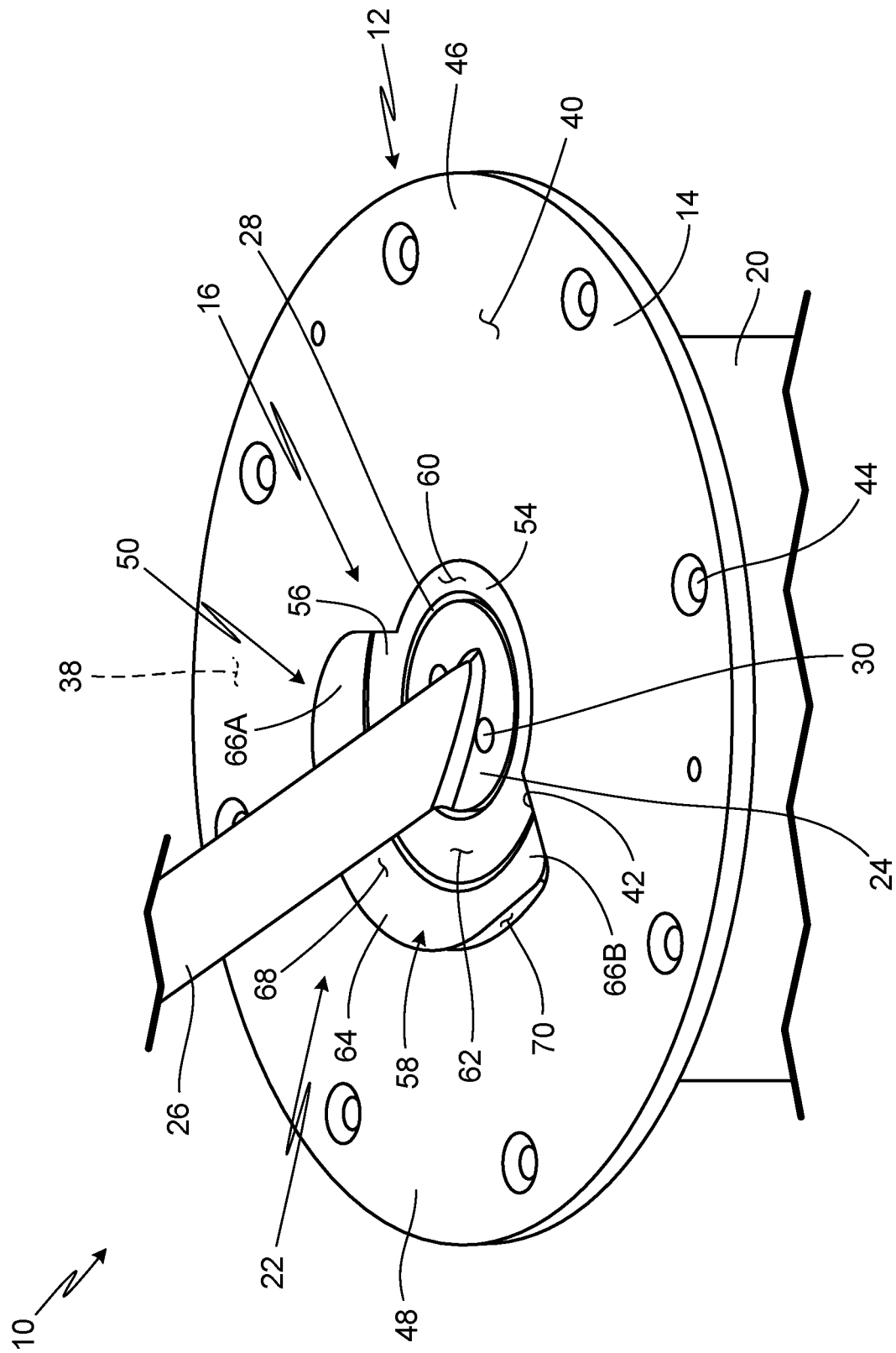
FIG. 1B is a partial isometric top view of the angle of attack sensor.
Figure 1C:
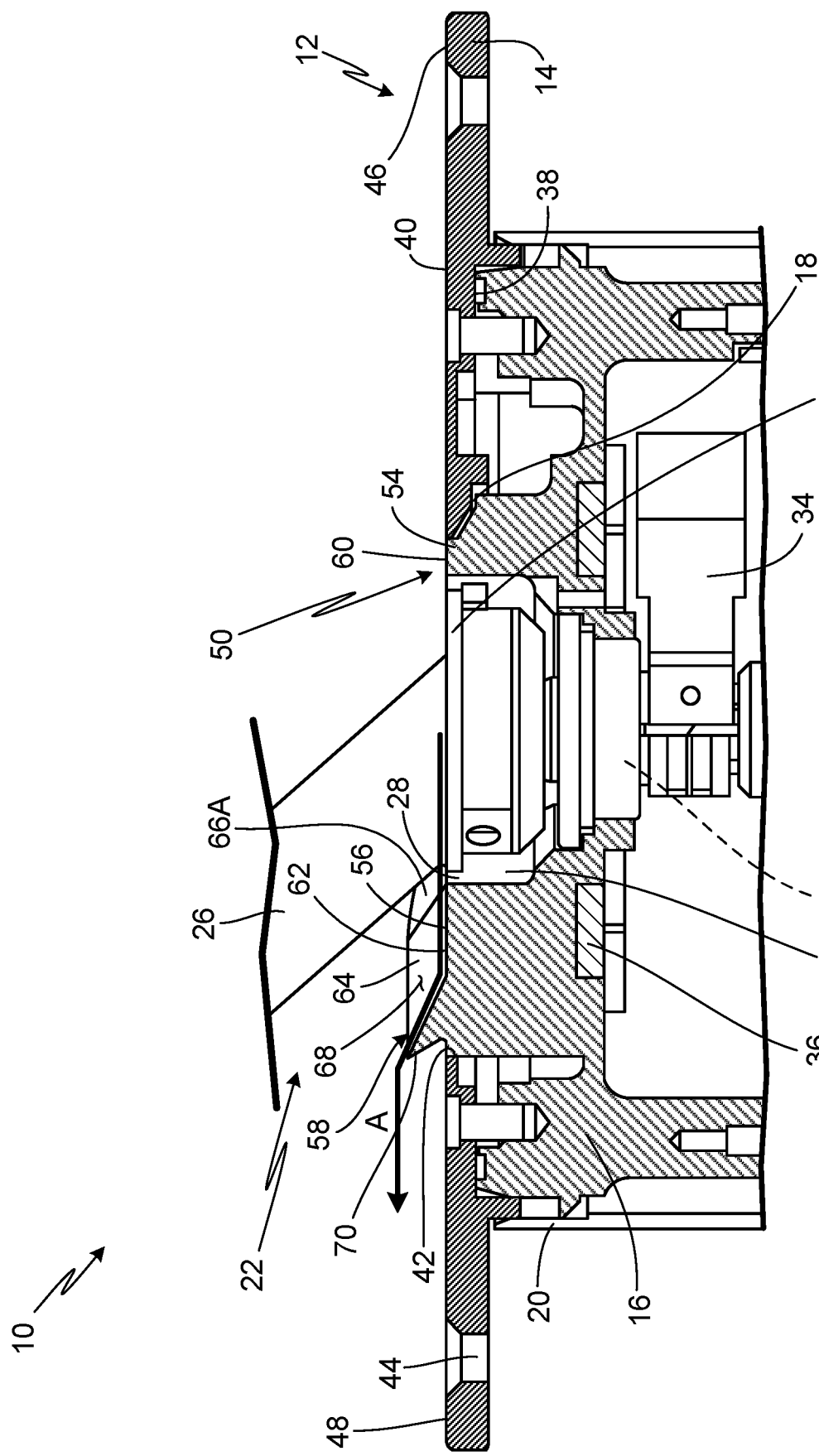
FIG. 1C is a partial cross-sectional side view of the angle of attack sensor.

FIG. 1A is a top view of angle of attack sensor 10. FIG. 1B is a partial isometric top view of angle of attack sensor 10. FIG. 1C is a partial cross-sectional side view of angle of attack sensor 10. Vane assembly 22 is not shown in cross-section in FIG. 1C. A lower portion of angle of attack sensor 10 has been omitted from FIGS. 1B and 1C for simplicity. FIGS. 1A, 1B, and 1C will be discussed together.

Angle of attack sensor 10 includes faceplate 12 (which includes mounting plate 14, heated chassis 16, and air gap 18), housing 20, vane assembly 22 (which includes vane base 24 and vane 26), annular gap 28, shaft connectors 30 (shown in FIGS. 1A and 1B), vane shaft 32 (shown in FIG. 1C), counterweight 34 (shown in FIG. 1C), and heater 36 (shown in FIG. 1C). Mounting plate 14 includes interior surface 38, exterior surface 40, opening 42, mounting holes 44, upstream portion 46, and downstream portion 48. Heated chassis 16 includes ring portion 50 and pocket 52 (shown in FIG. 1C). Ring portion 50 includes narrow portion 54, wide portion 56, and ramp 58. Narrow portion 54 includes exterior surface 60. Wide portion 56 includes exterior surface 62. Ramp 58 includes center section 64, tapered end sections 66A and 66B, inclined inner surface 68, and recessed outer surface 70.

Faceplate 12 is a multi-piece faceplate that includes mounting plate 14, or outer faceplate, and heated chassis 16, or inner faceplate. Mounting plate 14 is adjacent heated chassis 16. Heated chassis 16 is made of thermally conductive material. In this embodiment, heated chassis 16 is made of aluminum. In alternate embodiments, heated chassis 16 may include copper, other metals, metal alloys, or any other suitable thermally conductive material. Air gap 18 is a space between mounting plate 14 and heated chassis 16 that fills with air (or other insulating material). Mounting plate 14 is positioned on heated chassis 16 such that heated chassis 16 is located inward from or interior to mounting plate 14 with respect to housing 20. Housing 20 is cylindrical with an annular sidewall between an open first end and a closed second end. Faceplate 12 is positioned on housing 20 adjacent the open first end of housing 20. More specifically, heated chassis 16 is positioned within and connected to the open first end of housing 20 such that heated chassis 16 seals the open first end of housing 20. Mounting plate 14 is positioned on heated chassis 16 such that mounting plate 14 is adjacent the open first end of housing 20 and is outward from or exterior to heated chassis 16. As such, mounting plate 14 is an outer piece of faceplate 12 and heated chassis 16 is an inner piece of faceplate 12. Fasteners (not shown) connect mounting plate 14 and heated chassis 16.

Vane assembly 22 is adjacent faceplate 12. Vane assembly 22, which includes vane base 24 and vane 26, has a portion that is positioned in heated chassis 16 and extends through mounting plate 14. More specifically, vane base 24 is positioned in heated chassis 16. A first end of vane 26 is connected to vane base 24. Vane 26 extends through mounting plate 14. Annular gap 28 is adjacent vane base 24. Annular gap 28 is a space that surrounds vane base 24. Heated chassis 16 surrounds annular gap 28. As such, annular gap 28 is between vane base 24 and heated chassis 16. Consequently, annular gap 28 acts as a representation of the boundary between parts, such as vane 24 and vane base 24, that rotate and parts, such as mounting plate 14 and heated chassis 16, that do not rotate. Vane base 24 receives shaft connectors 30. Shaft connectors 30 extend through vane base 24. A first end of rotatable vane shaft 32 is connected to vane base 24 via shaft connectors 30. A second end of vane shaft 32 extends into housing 20. Counterweight 34 is mounted on the second end of vane shaft 32. As such, vane base 24, vane shaft 32, and counterweight 34 are configured to rotate together. Heater 36 is positioned on, or embedded in, heated chassis 16. Heater 36 is annular, extending all the way around an end of heated chassis 16 within housing 20. Heater 36 may be a self-regulating heater, a thermostatically controlled heater, or any other suitable heater.

Mounting plate 14 has interior surface 38 facing toward an interior of angle of attack sensor 10. Interior surface 38 faces heated chassis 16. Exterior surface 40 of mounting plate 14 is the surface opposite interior surface 38, or the surface of mounting plate 14 that faces external airflow. Mounting plate 14 has opening 42 at its center, opening 42 extending from interior surface 38 to exterior surface 40. Opening 42 is shaped to accommodate a portion of heated chassis 16 that extends into opening 42 of mounting plate 14. Vane assembly 22 also extends through mounting plate 14 at opening 42. More specifically, vane 26 extends through opening 42. Mounting holes 44 are located around a periphery of mounting plate 14. Mounting holes 44 extend through mounting plate 14 from interior surface 38 to exterior surface 40. In this embodiment, mounting plate 14 has eight mounting holes 44. In alternate embodiments, mounting plate 14 may have any number of mounting holes 44. Upstream portion 46 is a portion of mounting plate 14 that is upstream with respect to oncoming airflow when angle of attack sensor 10 is installed on an aircraft. Downstream portion 48 is a portion of mounting plate 14 that is downstream from upstream portion 46 (and downstream with respect to oncoming airflow) when angle of attack sensor 10 is installed on an aircraft. Downstream portion 48 is adjacent upstream portion 46.

Heated chassis 16 includes ring portion 50. Ring portion 50 is an annular portion of heated chassis 16 that extends into opening 42 of mounting plate 14 such that opening 42 extends around ring portion 50. Opening 42 is shaped to accommodate ring portion 50. Ring portion 50 extends around, or surrounds, vane assembly 22. Annular gap 28 is between ring portion 50 and vane assembly 22, such that ring portion 50 also surrounds annular gap 28. Heated chassis 16 defines pocket 52, within which a portion of vane assembly 22 is positioned. Specifically, vane base 24 of vane assembly 22 is positioned within pocket 52.

Narrow fore portion 54 makes up a front, or upstream, part of ring portion 50 and wide aft portion 56 makes up an aft, or downstream, part of ring portion 50. Ends of narrow portion 54 connect to ends of wide portion 56 to form a ring. In this embodiment, ends of narrow portion 54 meet ends of wide portion 56 at a centerline, or diameter, of ring portion 50. Ends of wide portion 56 are angled. Narrow portion 54 is radially narrow in comparison to wide portion 56, which is radially wide. Wide portion 56 is wider than narrow portion 54 such that wide portion 56 extends further toward a periphery of mounting plate 14. Ramp 58 is aft-located, or downstream, and connected to an outer end of wide portion 56. Ramp 58 is curved such that ends of ramp 58 are angled similar to ends of wide portion 56. Ramp 58 extends through opening 42 beyond, or above, exterior surface 40 of mounting plate 14 into oncoming airflow. In this embodiment, narrow portion 54, wide portion 56 and ramp 58 of ring portion 50 are thermally coupled to heater 36 in heated chassis 16. Narrow portion 54, wide portion 56, and ramp 58 of ring portion 50 are also a single unitary piece with, or are integral to, heated chassis 16.

Narrow portion 54 has flat exterior surface 60 at a surface of ring portion 50 that faces oncoming airflow, or an outer end of ring portion 50 with respect to housing 20. Narrow portion 54 extends into opening 42 such that exterior surface 60 of narrow portion 54 is about flush with exterior surface 40 of mounting plate 14. Wide portion 56 has flat exterior surface 62 at a surface of ring portion that faces oncoming airflow, or at an outer end of ring portion 50 with respect to housing 20. Wide portion 56 extends into opening 42 such that exterior surface 62 of wide portion 56 is about flush with exterior surface 40 of mounting plate 14. Exterior surface 62 is continuous with exterior surface 60.

Ramp 58 has center section 64 positioned between tapered end sections 66A and 66B. Center section 64 extends above, or beyond, exterior surface 40 of mounting plate 14 and protrudes into oncoming airflow. The maximum height of ramp 58 is at center section 64. In this embodiment, center section 64 has a constant height. Center section 64 is substantially normal to oncoming airflow when angle of attack sensor 10 is installed on an aircraft. Tapered end sections 66A and 66B decrease in height, or taper down, toward the ends of ramp 58, or towards the diameter of ring portion 50. In this embodiment, end portions of tapered end sections 66A and 66B are about flush with exterior surface 40 of mounting plate 14. Ramp 58 has inclined inner surface 68 at an inner surface of ramp 58 and recessed outer surface 70 at an outer surface of ramp 58. Inclined inner surface 68 has an incline in an aft, or downstream, direction. In this embodiment, inclined inner surface 68 is wider than narrow portion 54. Inclined inner surface 68 may have up to about a 45 degree incline. An inner end of inner surface 68 is connected to an outer end of exterior surface 62 of wide portion 56. As such, inclined inner surface 68 begins about flush with exterior surface 40 of mounting plate 14 and extends aft to a height above exterior surface 40 of mounting plate 14. Recessed outer surface 70 defines a periphery of ramp 58 and defines an arcuate recess below the outer edge of inclined inner surface 68.

Angle of attack sensors 10 are installed on the exterior of an aircraft and mounted to the aircraft via fasteners, such as screws or bolts, and mounting holes 44 on mounting plate 14. As a result, mounting plate 14 is about flush or just below flush with the skin of the aircraft and housing 20 extends within an interior of the aircraft. Vane 26 extends outside an exterior of the aircraft and is exposed to oncoming airflow, causing vane 26 and vane base 24 of vane assembly 22 to rotate with respect to mounting plate 14 and heated chassis 16 via a series of bearings within angle of attack sensor 10. Vane assembly 22 rotates based on the angle the aircraft is flying at relative to the oncoming airflow. More specifically, vane 26 rotates to be parallel with oncoming airflow. Vane 26 causes vane base 24 to rotate. Rotation of vane base 24 causes rotation of vane shaft 32, which is coupled to a rotational sensor that measures the local angle of attack or angle of the airflow relative to the fixed aircraft structure. Counterweight 34 is mounted on vane shaft 32 to counterbalance vane 26.

Heater 36 provides heat to heated chassis 16. Heated chassis 16 is made of thermally conductive material so that heated chassis 16 can conduct heat to the rotating components of angle of attack sensor 10, such as vane assembly 22 and vane shaft 32. Ring portion 50 allows heated chassis 16 to extend up to the exposed exterior surface 40 of mounting plate 14 in an area surrounding vane assembly 22 to provide heat to vane assembly 22. Ring portion 50 has a temperature above freezing in order to keep ice from forming on vane assembly 22 and in pocket 52. Heater 36 also provides heat to ramp 58 of ring portion 50. Heated chassis 26 maintains the area next to rotating components above freezing.

Mounting plate 14 is exposed to the external airflow, which is cold, and often contains water or ice particles. A periphery of mounting plate 14 is also adjacent the aircraft skin, which is below freezing. Further, mounting plate 14 and heated chassis 16 are thermally isolated, such as by air gap 18. Air gap 38 creates physical separation between mounting plate 14 and heated chassis 16 to limit conduction between mounting plate 14 and heated chassis 16. Air gap 38 also reduces convection between mounting plate 14 and heated chassis 16 by creating insulation between mounting plate 14 and heated chassis 16. Thus, portions of mounting plate 14 are below freezing, creating cold areas. Areas of mounting plate 14 away from ring portion 50, and rotating components, tend to be cold areas. For example, a periphery of mounting plate 14 radially outward from housing 20 is thermally coupled with the aircraft skin, or aircraft mounting surface, making exterior surface 40 in that area significantly colder than exterior surface 40 in an area of mounting plate 14 adjacent heated chassis 16.

On the other hand, mounting plate 14 can become relatively warm in some areas due to radiation and/or conduction from heater 36 through heated chassis 16 and/or warming of air gap 18 between mounting plate 14 and heated chassis 16, creating warm areas. For example, mounting plate 14 near ring portion 50 of heated chassis 16 is above freezing in certain environmental and flight conditions. Warm areas of mounting plate 14 are concentrated around ring portion 50, where heat is concentrated.

Therefore, mounting plate 14 is above freezing in some areas and below freezing in other areas. Ice particles from oncoming airflow that impinge on warm areas of exterior surface 40 of mounting plate 14 will melt. Melting ice creates runback, or droplets of water that migrate aft toward exterior surface 40 of downstream portion 48.

Oncoming airflow A is approximately normal, or perpendicular, to center section 64 of ramp 58. As runback flows over faceplate 12, inclined inner surface 68 of ramp 58 captures and re-routes, or redirects, runback (or fluid such as water droplets) in the vicinity of vane assembly 22 away from exterior surface 40 of mounting plate 14. Ramp 58 is angled to release the droplets into oncoming airflow, or passing airflow, away from exterior surface 40 of mounting plate 14. Tapered end sections 66A and 66B allow runback at ends of ramp 58 to be redirected up ramp 58.

Runback water can re-freeze into ice when it encounters cold areas of mounting plate 14, such as aft of vane 26, or when it reaches the aircraft skin at the periphery of mounting plate 14. Such ice can create a nucleation site for ice accumulation, and ice crystals and/or super-cooled water droplets in the oncoming airflow can accumulate around the runback-initiated nucleation site. Ice accumulation can grow to a significant mass, building up to form large ice horns, near vane 26, which can displace vane 26 and result in errant readings from angle of attack sensor 10.

Ramp 58 carries runback that has initiated on exterior surface 40 of upstream portion 46 of mounting plate 14 away from exterior surface 40 of mounting plate 14 so that water droplets cannot re-freeze and accumulate as ice in cold areas of exterior surface 40 in downstream portion 48 of mounting plate 14 aft of vane 26. Significant ice accumulation on exterior surface 40 of mounting plate 14 adjacent vane assembly 22 can deflect vane 26 to a substantial degree and affect the output of angle of attack sensor 10. Ramp 58 prevents such an occurrence by preventing nucleation of ice accumulation aft of vane 26. As such, ramp 58 eliminates deflection of vane 26 due to localized aerodynamics caused by ice accumulation in the vicinity of vane 26.

Wide portion 56 allows curved ramp 58 to be as close to a periphery of mounting plate 14 as possible, and thus extends the area of heated ring portion 50. Wider inclined surface 68 allows ramp 58 to cover a larger surface area. As a result, ramp 58 is able to capture and redirect as much runback near vane assembly 22 as possible. Capturing and releasing more water decreases the amount of runback in downstream portion 48 of mounting plate 14, decreasing the possibility of significant ice accumulation on faceplate 12 in the vicinity of vane 26. Because wide portion 56 has flat exterior surface 62, less convective heat transfer occurs and less heat is lost to oncoming airflow, than if wide portion 56 extended above, or beyond, exterior surface 40 of mounting plate 14. Further, because ramp 58 is heated, impinging water does not re-freeze or build up onto ramp 58 itself or form ice growths adjacent recessed outer surface 70. Inclined inner surface 68 is also angled to reduce vortices that may collect water, which could subsequently freeze, at recessed outer surface 70.

Mounting plate 14 is still removable without removing heated chassis 16 having ring portion 50 with ramp 58. Further, the existing architecture of heater 36 can be used with ring portion 50, avoiding a change to the heating scheme of angle of attack sensor 10. Further, wide portion 56 and ramp 58 are unitary with ring portion 50 of heated chassis 16, and thus, do not increase part count of angle of attack sensor 10.

Figure 2:
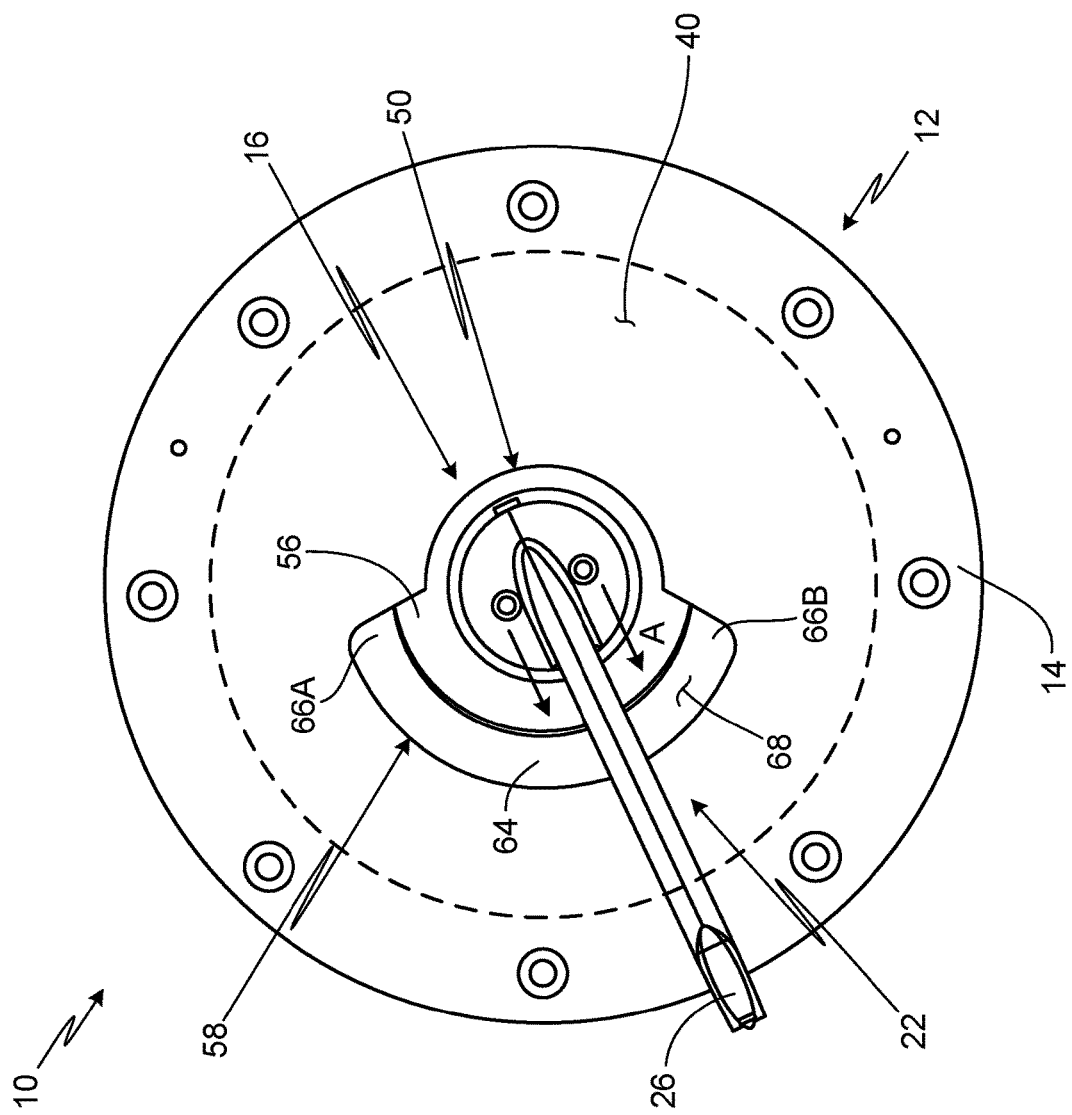
FIG. 2 is a top view of the angle of attack sensor positioned at a 25 degree orientation.

FIG. 2 is a top view of angle of attack sensor 10 positioned at a 25 degree orientation. Angle of attack sensor 10 includes faceplate 12 (which includes mounting plate 14 and heated chassis 16) vane assembly 22 (which includes vane 26). Mounting plate 14 includes exterior surface 40. Heated chassis 16 includes ring portion 50. Ring portion 50 includes wide portion 56 and ramp 58. Ramp 58 includes center section 64, tapered end sections 66A and 66B, and inclined inner surface 68.

Angle of attack sensor 10 has the same structure and function as described in reference to FIGS. 1A, 1B, and 1C. Angle of attack sensors 10 can be installed on the sides of an aircraft. Angle of attack sensors 10 may have an offset orientation, such as up to a plus or minus 25 degree orientation. FIG. 2 shows the positioning of angle of attack sensor 10 at a plus 25 degree orientation.

In such an orientation, a portion of center section 64 of ramp 58 remains directly behind vane 26 and is substantially normal to oncoming airflow A. A portion of center section 64 of ramp 58 remains directly behind vane 26 at an offset orientation because wide portion 56 allows ramp 58 to be farther away from vane assembly 22, or closer to a periphery of mounting plate 14, and to cover a larger surface area of mounting plate 14. As such, curved ramp 58 covers a wider range of angles of airflow A. Because oncoming airflow A is approximately normal, or perpendicular to center section 34, inclined inner surface 68 of ramp 58 can still capture and re-route runback in the vicinity of vane assembly 22 away from exterior surface 40 of mounting plate 14. Tapered end sections 66A and 66B allow runback at ends of ramp 58 to be redirected up ramp 58, which is particularly helpful in capturing runback in the vicinity of vane assembly 22 when angle of attack sensor is mounted at an offset orientation and, for example, tapered end section 66B is closer to vane 26.

Figure 3:
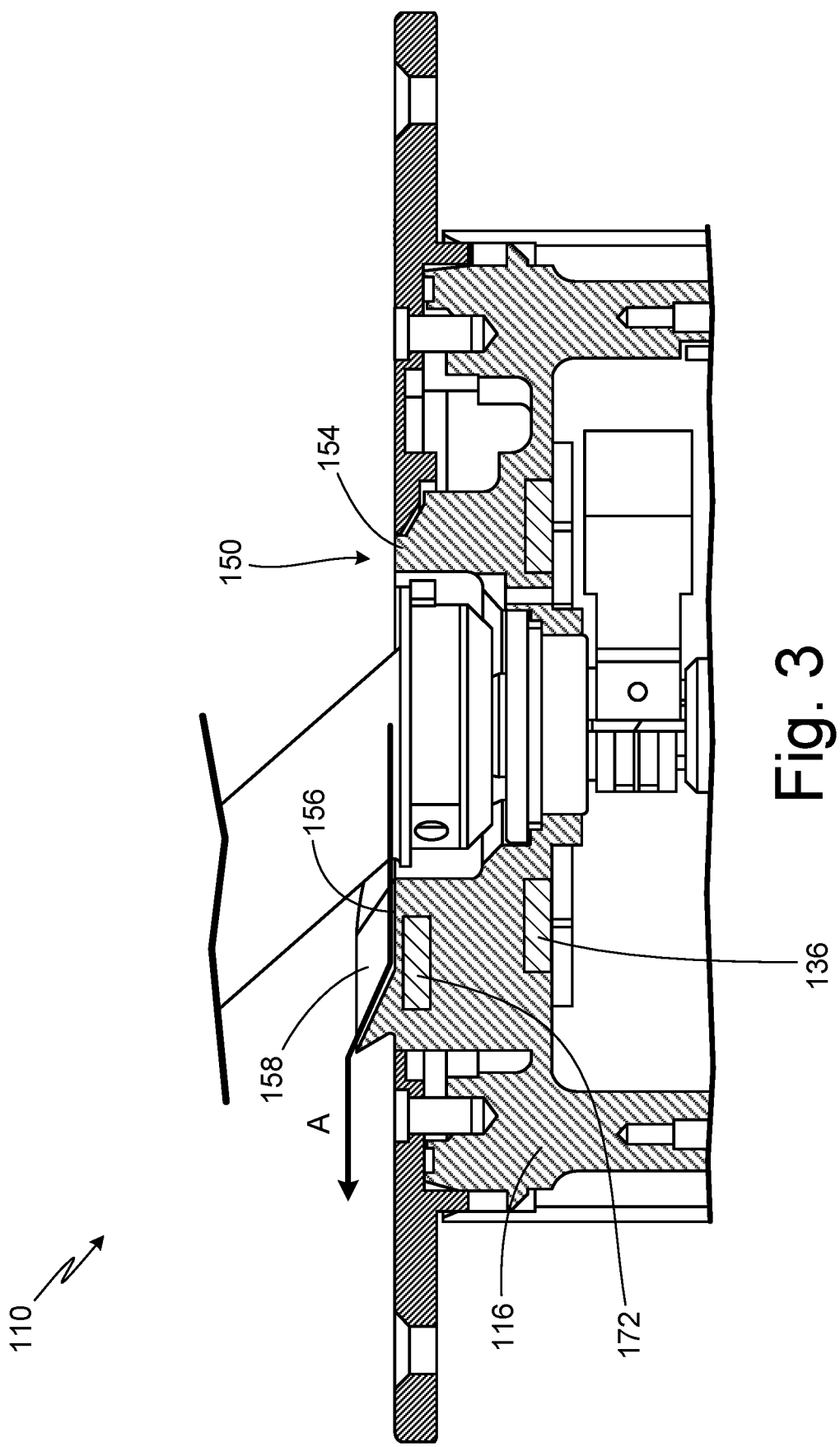
FIG. 3 is a partial cross-sectional side view of the angle of attack sensor having a ramp heater.

FIG. 3 is a partial cross-sectional side view of angle of attack sensor 110 having ramp heater 172. Angle of attack sensor 110 includes heated chassis 116, heater 136, and ramp heater 172. Heated chassis 116 includes ring portion 150. Ring portion 150 includes narrow portion 154, wide portion 156, and ramp 158.

Angle of attack sensor 110 has the same structure and function as angle of attack sensor 10 described in reference to FIGS. 1A, 1B, and 1C except that angle of attack sensor 110 also includes ramp heater 172. Ramp heater 172 is embedded in a cavity in heated chassis 116 directly beneath ramp 158 and is thermally coupled to ramp 158. Ramp heater 172 is as close to ramp 158 as possible. Ramp heater 172 has the same curved shaped as ramp 158 such that ramp heater 172 extends the entire length of ramp 158. Ramp heater 172 is dedicated to heating ramp 158 of ring portion 150.

Because ring portion 150 is extended beyond narrow portion 154 to include wide portion 156 and ramp 158, ring portion 150 has increased surface area exposed to oncoming airflow A. Thus, more power is required to heat ring portion 150 of heated chassis 116. Such power may be drawn from heater 136. However, if too much power is drawn from heater 136 to heat ramp 158, less heat may be directed to the rest of heated chassis 116. Ramp heater 172 is separate from heater 136 and can provide the additional power required for heating ramp 158. As a result, ramp 158 does not increase the power draw from heater 136, allowing a sufficient amount of heat from heater 136 to be directed to rotating components to prevent icing up and dysfunction of vane assembly 22.

DISCUSSION OF POSSIBLE EMBODIMENTS

The following are non-exclusive descriptions of possible embodiments of the present invention.

An angle of attack sensor includes a vane assembly; and a multi-piece faceplate adjacent the vane assembly, the faceplate including: a mounting plate having an opening; and a heated chassis positioned adjacent the mounting plate and having a ring portion extending into the opening, the ring portion including: a narrow fore portion extending into the opening; a wide aft portion extending into the opening; and an aft-located ramp connected to the wide aft portion and extending through the opening beyond an exterior surface of the mounting plate.

The angle of attack sensor of the preceding paragraph can optionally include, additionally and/or alternatively, any one or more of the following features, configurations and/or additional components:

An exterior surface of the narrow fore portion is flat and about flush with the exterior surface of the mounting plate.

An exterior surface of the wide aft portion is flat and about flush with the exterior surface of the mounting plate.

The ramp includes: tapered end sections; and a center section between the tapered end sections.

The center section extends beyond the exterior surface of the mounting plate.

The angle of attack sensor further includes a heater thermally coupled to the narrow fore portion, the wide aft portion, and the ramp.

The narrow fore portion, the wide aft portion, and the ramp of the ring portion are integral to the heated chassis.

The ramp includes an inclined inner surface with an incline in an aft direction.

The inclined inner surface has up to about a 45 degree incline.

The ramp includes a recessed outer surface defining a periphery of the ramp.

A ramp heater embedded in the heated chassis directly beneath the ramp and thermally coupled to the ramp.

The ramp heater has the same curved shape as the ramp such that the ramp heater extends an entire length of the ramp.

The ramp is contoured to re-route water away from the exterior surface of the mounting plate.

A method for preventing significant ice accumulation on an exterior surface of a faceplate adjacent a vane assembly, the faceplate including a heated chassis adjacent a mounting plate, includes re-routing fluid away from the exterior surface of the mounting plate with an aft-located ramp connected to a wide portion of the heated chassis; and releasing the fluid into passing airflow.

A heated chassis for use in an angle of attack sensor having a vane assembly and a multi-piece faceplate including a mounting plate with an opening, the heated chassis positioned adjacent the mounting plate and including a pocket within which a portion of the vane assembly is positioned; and a ring portion including: a narrow fore portion extending through the opening; a wide aft portion extending through the opening; and an aft-located ramp connected to the wide aft portion and extending through the opening beyond an exterior surface of the mounting plate.

The heated chassis of the preceding paragraph can optionally include, additionally and/or alternatively, any one or more of the following features, configurations and/or additional components:

An exterior surface of the narrow fore portion is flat and about flush with the exterior surface of the mounting plate.

An exterior surface of the wide aft portion is flat and about flush with the exterior surface of the mounting plate.

The ramp includes: tapered end sections; and a center section between the tapered end sections.

The narrow fore portion, the wide aft portion, and the ramp of the ring portion are integral to the heated chassis.

The ramp includes: an inclined inner surface with an incline in an aft direction; and a recessed outer surface defining a periphery of the ramp.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An angle of attack sensor comprising:
a vane assembly; and a multi-piece faceplate adjacent the vane assembly, the faceplate including:
  a mounting plate having an opening; and
  a heated chassis positioned adjacent the mounting plate and having a ring portion extending into the opening, the ring portion including:
    a narrow fore portion extending into the opening;
    a wide aft portion extending into the opening; and
    an aft-located ramp connected to the wide aft portion and extending through the opening beyond an exterior surface of the mounting plate.

2. The angle of attack sensor of claim 1, wherein an exterior surface of the narrow fore portion is flat and about flush with the exterior surface of the mounting plate.

3. The angle of attack sensor of claim 1, wherein an exterior surface of the wide aft portion is flat and about flush with the exterior surface of the mounting plate.

4. The angle of attack sensor of claim 1, wherein the ramp includes:
  tapered end sections; and
  a center section between the tapered end sections.

5. The angle of attack sensor of claim 4, wherein the center section extends beyond the exterior surface of the mounting plate.

6. The angle of attack sensor of claim 1, wherein the angle of attack sensor further includes a heater thermally coupled to the narrow fore portion, the wide aft portion, and the ramp.

7. The angle of attack sensor of claim 1, wherein the narrow fore portion, the wide aft portion, and the ramp of the ring portion are integral to the heated chassis.

8. The angle of attack sensor of claim 1, wherein the ramp includes an inclined inner surface with an incline in an aft direction.

9. The angle of attack sensor of claim 8, wherein the inclined inner surface has up to about a 45 degree incline.

10. The angle of attack sensor of claim 1, wherein the ramp includes a recessed outer surface defining a periphery of the ramp.

11. The angle of attack sensor of claim 1, and further including a ramp heater embedded in the heated chassis directly beneath the ramp and thermally coupled to the ramp.

12. The angle of attack sensor of claim 11, wherein the ramp heater has the same curved shape as the ramp such that the ramp heater extends an entire length of the ramp.

13. The angle of attack sensor of claim 1, wherein the ramp is contoured to re-route water away from the exterior surface of the mounting plate.

14. A method for preventing significant ice accumulation on an exterior surface of a faceplate adjacent a vane assembly, the faceplate including a heated chassis adjacent a mounting plate, the method comprising:
  re-routing fluid away from the exterior surface of the mounting plate with an aft-located ramp connected to a wide portion of the heated chassis; and
  releasing the fluid into passing airflow.

15. A heated chassis for use in an angle of attack sensor having a vane assembly and a multi-piece faceplate including a mounting plate with an opening, the heated chassis positioned adjacent the mounting plate and comprising:
  a pocket within which a portion of the vane assembly is positioned; and
  a ring portion including:
    a narrow fore portion extending through the opening;
    a wide aft portion extending through the opening; and
    an aft-located ramp connected to the wide aft portion and extending through the opening beyond an exterior surface of the mounting plate.

16. The heated chassis of claim 15, wherein an exterior surface of the narrow fore portion is flat and about flush with the exterior surface of the mounting plate.

17. The angle of attack sensor of claim 15, wherein an exterior surface of the wide aft portion is flat and about flush with the exterior surface of the mounting plate.

18. The angle of attack sensor of claim 1, wherein the ramp includes:
  tapered end sections; and
  a center section between the tapered end sections.

19. The angle of attack sensor of claim 15, wherein the narrow fore portion, the wide aft portion, and the ramp of the ring portion are integral to the heated chassis.

20. The angle of attack sensor of claim 15, wherein the ramp includes:
  an inclined inner surface with an incline in an aft direction; and
  a recessed outer surface defining a periphery of the ramp.

* * * * *